Oct. 1, 1968  A. J. CAMPANELLA  3,404,276
AIRCRAFT GUIDANCE SYSTEM FOR LOCATING A LANDING AREA
Filed June 9, 1964  4 Sheets-Sheet 1
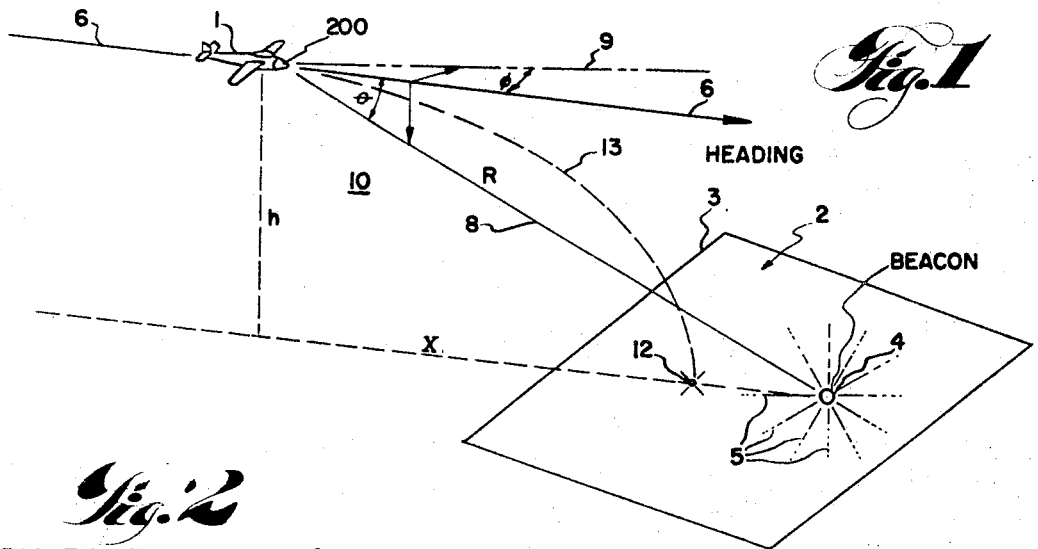
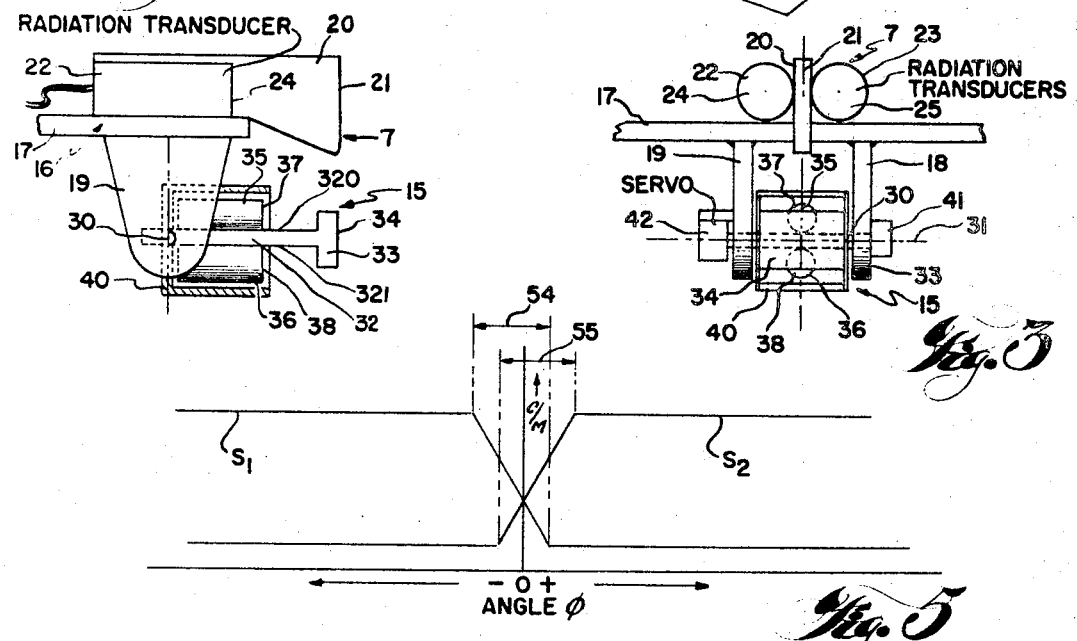
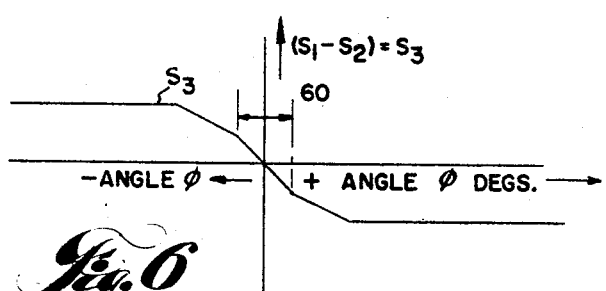
INVENTOR
ANGELO J. CAMPANELLA
BY William T. Fryer III
ATTORNEY

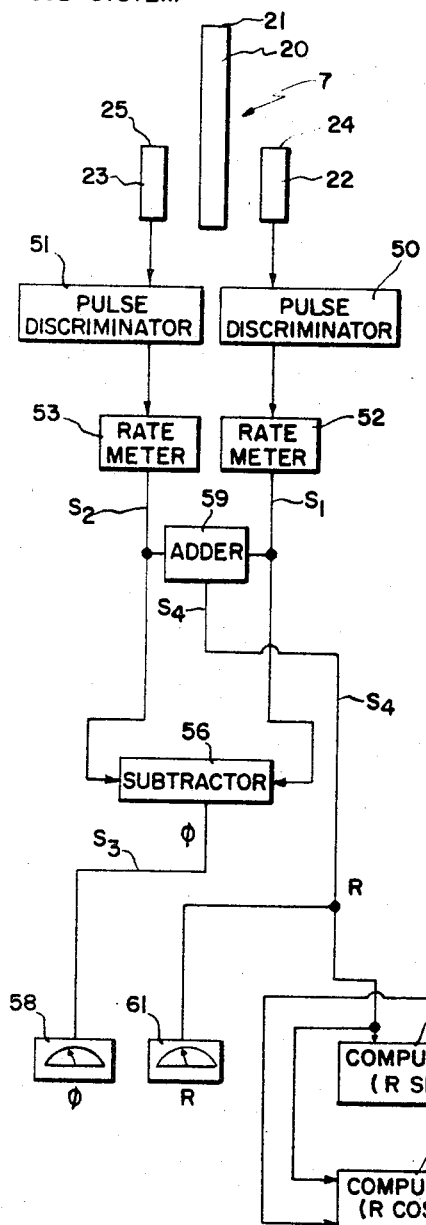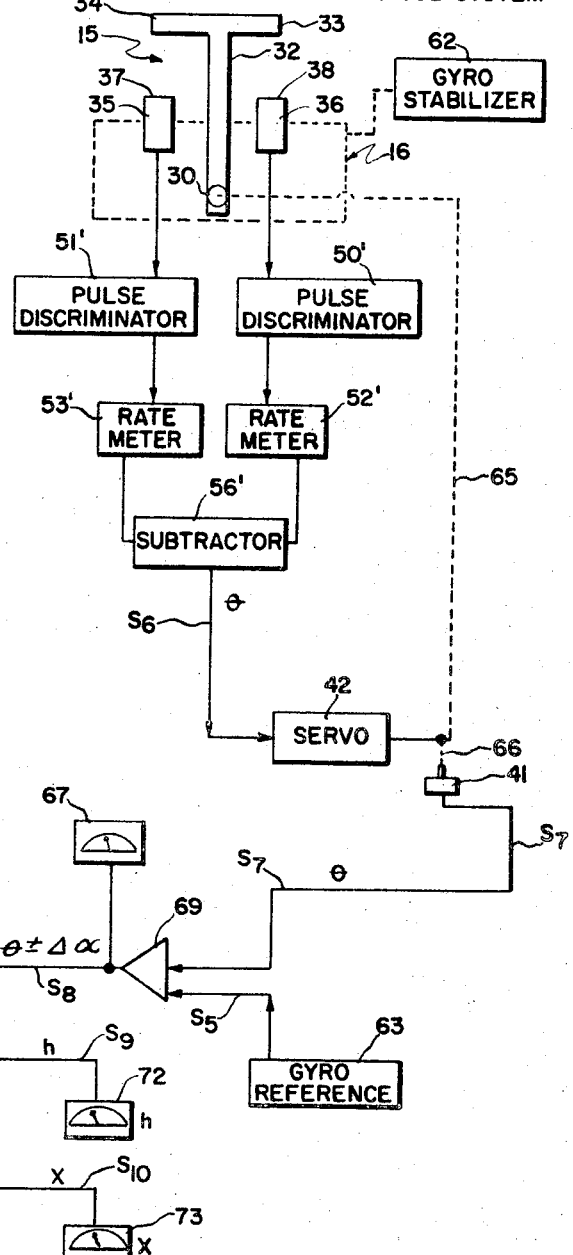
Fig. 4
INVENTOR
ANGELO J. CAMPANELLA

Oct. 1, 1968 A. J. CAMPANELLA 3,404,276
AIRCRAFT GUIDANCE SYSTEM FOR LOCATING A LANDING AREA
Filed June 9, 1964 4 Sheets-Sheet 3

INVENTOR
ANGELO J. CAMPANELLA
BY William T. Fryer III
ATTORNEY

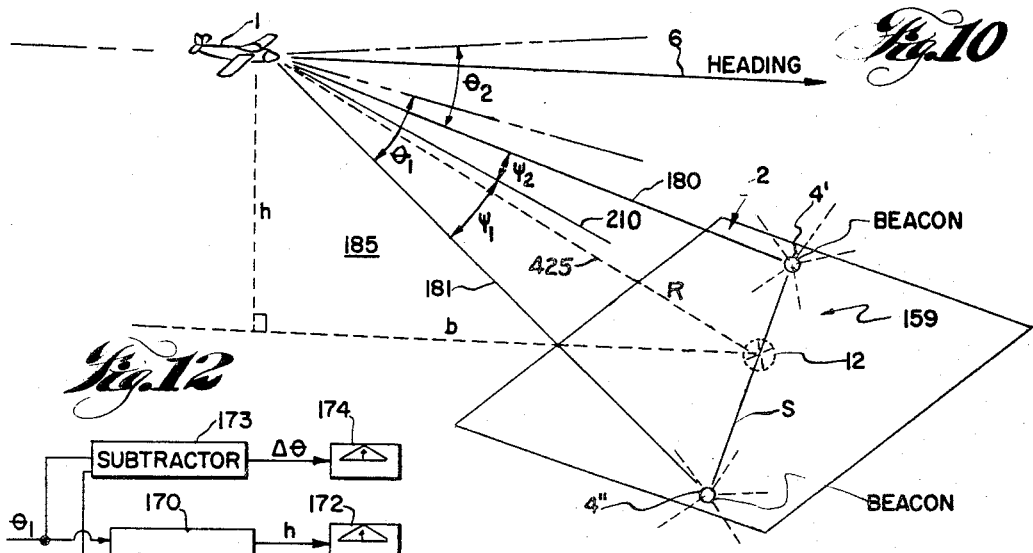
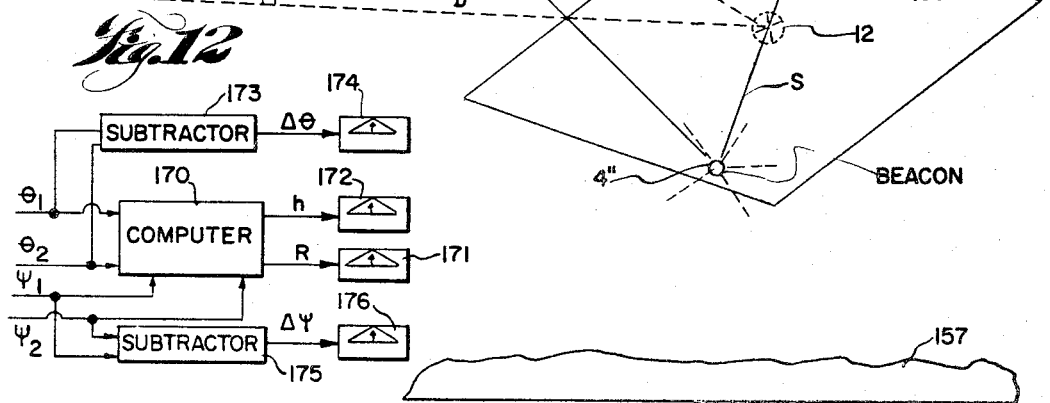
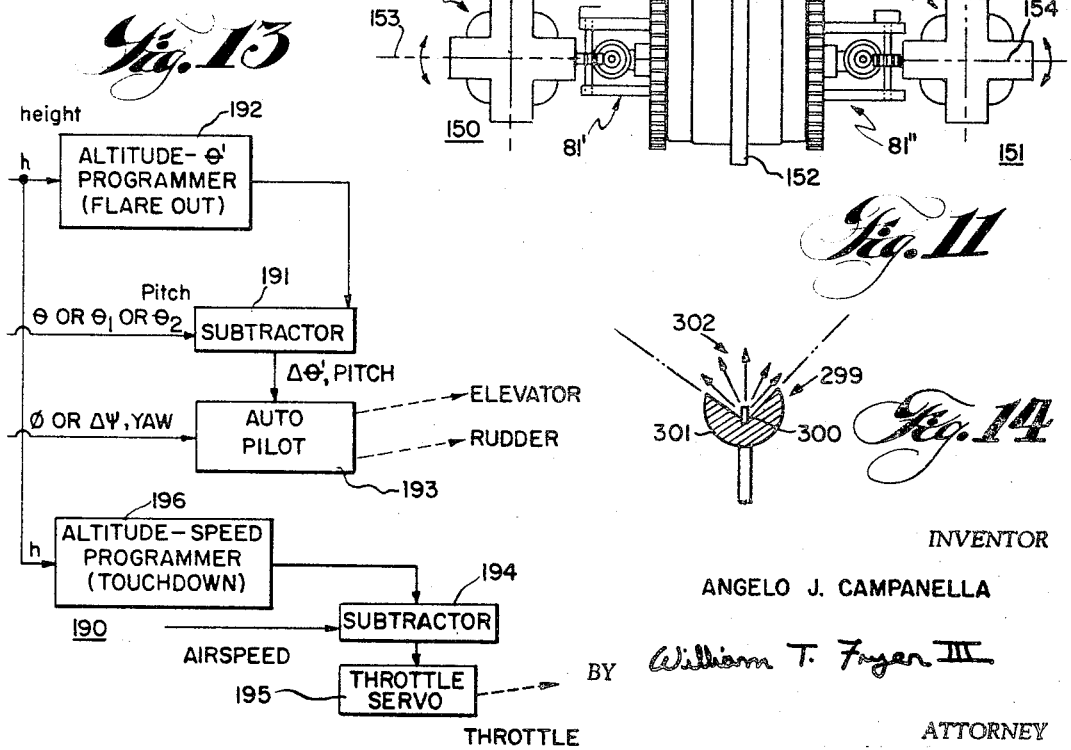
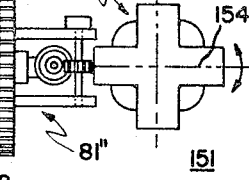
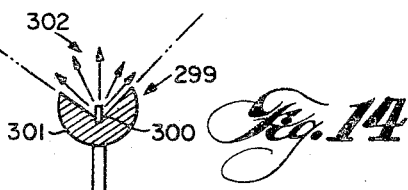
INVENTOR
ANGELO J. CAMPANELLA
BY William T. Fryer III
ATTORNEY United States Patent Office 3,404,276
Patented Oct. 1, 1968

3,404,276
AIRCRAFT GUIDANCE SYSTEM FOR LOCATING
A LANDING AREA
Angelo J. Campanella, Columbus, Ohio, assignor to Industrial Nucleonics Corporation, a corporation of Ohio
Filed June 9, 1964, Ser. No. 373,790
8 Claims. (Cl. 250—83.3)

The present invention is related to navigation of aircraft in all types of weather. More particularly, the present invention is concerned with apparatus for locating and navigating an aircraft to a landing area.

There are several present systems for navigating an aircraft to landing areas. Radio and radar systems are effective for long range navigation, but, when the aircraft must be navigated almost until it lands, these systems are not completely effective. One prior proposal for an aircraft navigational system suggested that an X-ray beam be located at the landing area and a hand-held instrument be aligned with the X-ray radiation, U.S. Patent 1,948,-552, to S. L. Weber et al., issued Feb. 27, 1934. Another proposed navigational system provided directional detectors that aligned with infrared radiation from the landing area and measured the angular displacement of the detectors to calculate range and height, U.S. Patent 2,070,-178, to F. M. Pottenger, Jr., et al., issued Feb. 9,1937. Each of the aforementioned proposed navigation systems had advantages and limitations and an improved navigational system was still needed that increases its accuracy at close range.

An accurate short range guidance system is also important in permitting safe, reliable landings in regions where, due to terrain or normal weather conditions, the landing area is difficult to locate and radio or radio navigation cannot be used. In a tactical military situation, for example, it is desirable that aircraft with short landing and take-off capabilities land in foul weather or in the night at a make-shift field with a minimum of disclosure. Light or radio navigational systems cannot be used because they can be detected rather easily. The preferred navigational system for military application should use a radiation beacon that can penetrate fog and other weather disturbances for navigational purposes and not be readily detected by the enemy. A remote landing field location also dictates that a large, complex ground installation is impractical.

The present invention offers a solution to the problem of navigating an aircraft at short range to a landing area in all kinds of weather. The system is highly accurate, and is practical for installation on small aircraft and use in a remote landing area where apparatus weight and complexity must be kept to a minimum.

These and other objects, advantages and features are accomplished by the present invention which, in one preferred embodiment, comprises a beacon positioned in a landing area for emitting a substantially omnidirectional nuclear radiation beam, such as a source of gamma rays. An aircraft is equipped with means for sensing the direction of radiation from the beacon and providing a first signal that is a function of angular deviation of the radiation from the aircraft heading in a first reference plane. A second signal is produced that is a function of angular deviation of the radiation from the aircraft heading in a second reference plane. The first and second reference planes intersect. The aircraft has means responsive to the first and second signals for providing navigational information.

Several preferred apparatus embodiments are described in the drawings, wherein,

FIG. 1 is a perspective view of an airplane and landing area to illustrate one embodiment of navigation system in accordance with the present invention.

FIG. 2 is a side elevation view of direction detectors mounted on the airplane shown in FIG. 1.

FIG. 3 is a front elevation view of the directional detectors shown in FIG. 2.

FIG. 4 is a block diagram of one arrangement of an electrical system for the directional detectors of FIGS. 2 and 3.

FIGS. 5 and 6 are graphs for illustrating the operation of the directional detectors and the electrical system of FIG. 4.

FIG. 10 is a perspective view of an airplane and landing area for illustrating another navigational system embodiment of the present invention.

FIG. 11 is a front elevation view of directional detectors mounted on the airplane shown in FIG. 10.

FIG. 12 is a block diagram of one type of computer for use with the directional detectors of FIG. 11, to provide navigational information.

FIG. 13 is a block diagram of a computer that automatically guides an aircraft by processing the information provided by any of the navigational systems of the present invention.

FIGURE 14 is a side elevation view of one embodiment of a source for use in the present invention.

Figure 7:
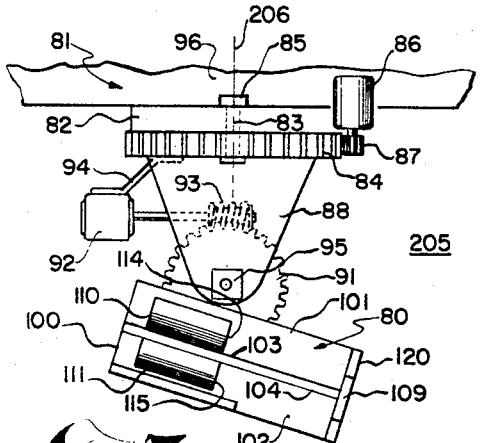
FIG. 7 is a side elevation view of another embodiment of directional detector for installation in the airplane and at the landing field shown in FIG. 1, in accordance with the present invention.

A detailed description of the preferred embodiments commences with reference to FIG. 1, wherein an airplane 1 is shown approaching a landing area 2, defined by the border 3. Assume, for example, that landing area 2 is in a remote region, possibly in a military enemy's territory. Friendly forces are at landing area 2 and need supplies, but the pilot of airplane 1 is unable to find landing area 2 because of fog or due to darkness. Radio or radar navigational aids cannot be used, because of enemy electronic surveillance. Another assumption could be that landing area 2 is in a remote region of rough terrain where normal navigational aids are not available and supplies must be dropped or landed precisely in a relatively small area to prevent damage to the supplies or airplane. A still further example is where landing area 2 is on a roof top of a tall building that is shrouded in fog.

The situations described above are merely examples of where there is a need for a short range, accurate, all weather navigational system. According to the present invention, a navigational system 10 (FIG. 1) comprises a beacon 4 of penetrative radiation located at landing area 2. Beacon 4 produces nuclear radiation, such as gamma rays, bremsstrahlung or X-rays that easily penetrate fog and other weather disturbances, but are not subject to detection at great distances, beyond one or two thousand feet, for example. The radiation is substantially uniform and substantially omnidirectional, at least in all directions above the landing area 2 in a large solid angle, and travels outwardly along essentially straight lines of direction 5 origina ing at the beacon. Several types of beacons can be utilized, such as a continuously emitting X-ray tube or radioactive material housed in a shielded container to produce a single source radiating bremsstrahlung or gamma rays at a large solid angle. Suitable gamma ray sources are described in my copending patent application Ser. No. 357,494, filed Apr. 6, 1964, owned by the assignee of the present application, as illustrated for example in FIGURE 14, showing source 299 with capsule 300 of radioactive material, and shield 301 that has a conical opening at the top, with the vertex at capsule 300, thereby providing a broad radiation cone 302. Suitable X-ray tubes are known in the art. Radioactive sources have the unique advantages of roughed construction, and needs no complex accessory equipment. The source can be turned off by placing a cover attenuator thereover or with the bremsstrahlung source by turning off the beta rays.

Airplane 1 is equipped with one or more directional detectors to continuously measure angular deviations of beacon 4 radiation from the airplane heading 6 and to measure the beacon range R, thereby providing navigational information on the location of landing area 2. The directional detector(s) measures the elevation radiation angle $\theta$ in a vertical plane with respect to a reference position and measures the azimuth radiation angle $\phi$ in a horizontal plane with respect to a reference position. Navigational system 10 provides guidance information from computers in the form of electrical signals that are a function of $\theta$, $\phi$, and R, and airplane height $h$ above landing field 2 in the vertical plane, either to a pilot or autopilot.

The geometrical relationship described above and shown in FIG. 1 is constantly changing as airplane 1 approaches landing area 2. Heading 6 is a line that represents the nominal direction of airplane 1. Heading 6 is normally parallel to the aircraft rotational axis and can be coincident thereto. The horizontal and vertical planes mentioned above are planes in which the angular deviations from the heading 6 are measured. These measurements provide steering and rate of decent information until airplane 1 reaches touchdown 12 following path 13. The directional detector(s) can be arranged to continue to make measurements in the vertical and horizontal planes even when airplane 1 is banking or turning.

Airplane 1 is equipped with directional detectors 7 and 15 (FIGS. 2 and 3). Directional detectors 7 and 15 are supported on a carriage 16 that is fixedly mounted on aircraft in the nose cone 200, for example, or on the airplane body and retractable into a well when not in use. The particular type of mount and location therefore depends on the kind of aircraft. Carriage 16 can be supported by a universal mount that maintains the attitude in a pre-set position irrespective of movement of airplane 1, as will be described in detail further on. Carriage 16 is composed of a platform 17 and downwardly extending, parallel arms 18 and 19.

Directional detector 7 is arranged to measure the azimuth angular deviation $\phi$ of airplane 1 from beacon 4. Platform 17 is maintained in a horizontal plane, either by having the pilot fly airplane 1 in the position or by a gyro stabilizer on the carriage 16. Platform 17 has fixed to it a plate shadow-edge member 20 having its opposite sides vertically disposed and its elongation and leading edge 21 in the direction of airplane heading 6. Back from leading edge 21 and on opposite sides of shadow-edge member 20 are radiation transducers 22 and 23 having radiation reception faces 24 and 25, respectively. In this embodiment beacon 4 is assumed to be a source of gamma rays and, accordingly, radiation transducers are primarily sensitive to gamma rays and each produce an electrical signal proportional to the radiation intensity at the reception face. Several types of radiation transducers can be utilized. Radiation transducers 22 and 23 produce electrical pulses with amplitudes proportional to the radiation intensity and can be either a proportional counter or a photo-multiplier tube and scintillation crystal, for example. Each radiation transducer is housed to reduce the effect of radiation arriving from the sides and rear.

Directional detector 15 is arranged to measure the elevation angular deviation $\theta$ of airplane 1 from beacon 4. Detector 15 is supported between arms 18 and 19 to pivot on a shaft 30 whose axis 31 is maintained horizontal. Shaft 30 has fixed to it a T-shaped shadow-edge member 32 having a cross end piece 33 with a leading face 34 lying in a vertical plane and upper and lower sides 320 and 321. Disposed on upper and lower sides 320 and 321 of shadow-edge member are radiation transducers 35 and 36, respectively, of the same construction as radiation transducers 22 and 23, having radiation reception faces 37 and 38, respectively. Cross end piece 33 equally and partially covers the reception faces 37 and 38, looking from the front as in FIG. 3. Detector 15 is enclosed by a shield 40 to reduce the effect of radiation arriving at the rear and sides. The reference position of detector 15 is with the elongation of shadow-edge member 32 pointing in the direction of aircraft heading 6. The point axis of directional detector 15 is the direction of the shadow-edge member elongation and moves in a vertical plane. Shaft 30 has a position sensor 41 attached to it to produce an electrical signal that is a function of the angular deviations from the reference position, for example, zero signal at the reference position and plus for deviation in one direction and minus for deviation in the other direction from the reference position. Shaft 30 is coupled to a servomotor 42, mounted on arm 19, that positions detector 15 in response to an electrical signal, the derivation of which is described further on. (Servomotor 42 is omitted from FIG. 2 to facilitate the presentation of other parts.)

Directional detectors 7 and 15 are coupled to an electrical system 45 (FIG. 4) that provides the signal for controlling servomotor 42 and reading out the angular deviations $\theta$, $\phi$, and range R. The principle upon which each of directional detectors 7 and 15 operates to align with the radiation from beacon 4 is the maintenance of a predetermined radiation balance at the radiation reception faces.

Detector 7 is aligned with radiation in a horizontal plane when transducers 22 and 23 receive equal radiation intensity. Even if beacon 4 is below the horizontal plane, platform 17 is cut back at its forward end so that radiation from beacon 4 reaches each of radiation transducers 22 and 23. The electrical pulses from radiation transducers 22 and 23 are coupled to pulse discriminators 50 and 51, respectively, and to count-rate circuits 52 and 53, respectively, to produce continuous electrical signals $S_1$ and $S_2$ that are a function of the radiation intensity (count rates) at the respective reception faces 24 and 25. The variation of signals $S_1$ and $S_2$ (count rates) with angle $\phi$ is illustrated in FIG. 5. The count rate from each radiation transducer starts at a nominal low value, due mainly to background radiation, and increases as the directional detector moves closer into alignment with radiation from beacon 4, to a maximum, saturation level, when beacon 4 is completely on the same side of the radiation transducer. Signals $S_1$ and $S_2$ are substantially a function of $\phi$ in the ranges 54 and 55 (FIG. 5) respectively. Signals $S_1$ and $S_2$ are subtracted in a subtractor 56 to obtain a signal $S_3$ (FIG. 6) that is a function of the difference in count rates. When the count rates are equal, signal $S_3$ is zero and $\phi$ is zero. The difference in count rates over a range 60 of $\phi$ (FIG. 6) is proportional to $\phi$ and beyond this range there is a substantial functional relationship of $S_3$ with $\phi$. Since signal $S_3$ has positive or negative values, depending on which side of shadow-edge member 20 beacon 4 is located, meter 58, coupled to signal $S_3$ can be calibrated to read out $\phi$ in plus or minus degrees from the aircraft heading 6. Meter 58, located in the pilot's instrument panel, gives the information on which direction to steer airplane 1 to reach beacon 4.

The slant range R to beacon 4 is measured by adding the count rates, the slant range R being a function of total intensity reaching radiation transducers 22 and 23. Signals $S_1$ and $S_2$ are added by an adder 59 to provide a signal $S_4$ that is a function of the total count rates. Signal $S_4$ is coupled to meter 61 which is calibrated in units of distance to read out the slant range R to beacon 4.

Directional detector 15 has its pointing axis aligned with the direction of radiation from beacon 4 in a plane. Shadow-edge member 32 pivots in the plane that is held very close to vertical, either by the pilot or a gyro stabilizer 62 that controls servos (not shown) to adjust the position of detector 15 in a universal mount (not shown) and/or is mounted on platform 17 to stabilize carriage 16 (represented by dotted outline in FIG. 4). In addition to or as an alternative, a deviation of shadow-edge member 32 from a vertical plane can be sensed by a gyro reference 63 that produces a signal $S_5$ that is a function of the deviation and is coupled in a manner to be described to compensate for the deviation.

The output signals from radiation transducers 35 and 36 of directional detector 15 are processed in the same fashion as with directional detector 7, to obtain a signal $S_6$ that is a function of the difference in count rates at the radiation transducer reception faces 37 and 38. The pulses from radiation transducers 35 and 36 are passed through pulse discriminators 50' and 51', respectively, to rate meters 52' and 53', respectively, and the resultant signals are subtracted in subtractor 56'. Signals from rate meters 52' and 53' vary in the same manner as described for signals $S_1$ and $S_2$ in FIG. 5. Signal $S_6$ is a function of the angular deviation $\theta$ of the pointing axis of shadow-edge member 32 from alignment with the radiation in a vertical plane, corresponding to the variation of signal $S_3$ in FIG. 6. Signal $S_6$ is coupled to servo 42 that mechanically positions (control represented by dash line 65) shadow-edge member 32 until $S_6$ is zero, at which point shadow-edge member 32 is in alignment with the radiation from beacon 4 in the vertical plane. Directional detector 15 continuously tracks beacon 4 in the vertical plane even when airplane 1 is not heading towards beacon 4, since the radiation transducers effectively "see" to a degree on either side of the aircraft heading 6.

Sensor 41, coupled to shaft 30 (represented by dash line 66) provides a signal $S_7$ that is a function of the elevation angle between the reference position of shadow-edge member 32 and the pointing axis, direction of beacon 4 in the vertical plane. If no gyro reference compensation is provided, signal $S_7$ is coupled directly to meter 67, which is calibrated in degrees plus and minus from the reference position. If a gyro reference 63 is utilized its signal $S_5$ from the gyro reference 63 is combined with signal $S_7$ in an adder 69 to compensate for deviations from the vertical and the resultant signal is $S_8$.

After the basic signals that are a function of $\phi$, $\theta$, and R are derived, further navigational information can be computed, if desired. Signals $S_4$ and $S_8$ are fed to a computer 70 of the analogue type, to compute the airplane height $h$ above landing area 2 and to a computer 71 to compute the horizontal distance X to landing area 2. Computer 70 performs the operation $R \sin \theta$ to provide a signal $S_9$ to meter 72 calibrated in units of distance to read out height. Computer 71 performs the operation $R \cos \theta$ to provide a signal $S_{10}$ to meter 73 calibrated in units of distance to read out horizontal distance to beacon 4.

Meters 58, 61, 67, 72, and 73 are located on the pilot's instrument panel. Preferably, the information as to $\phi$, R, $\theta$, $h$, and X is presented in an integrated flight display, such as is used for ILS information, for convenience.

The pilot of airplane 1 will first be aware of proximity to beacon 4 from meter 61, indicating a measurable gamma ray intensity in the region. Then, he observes meter 58 and steers the aircraft heading towards beacon 4. Directional detector 15 continuously tracks beacon 4 and meter 67 reads out the elevation angle to beacon 4. The pilot can guide airplane 1 to landing area 2 with only this information to drop supplies. Meters 72 and 73 are used to guide airplane 1 down to a landing or until a visual landing can be accomplished.

Discriminators 50, 51, 50', 51' are arranged to pass all pulses above a certain minimum level or in a band centered around the primary energy of the gamma rays from beacon 4 for the purposes of beacon identification. The various components of electrical system 45 individually can be of several conventional designs. Further, the manner of combination of the rate meter output signals is dependent on the electronics, i.e., whether the rate meters are designed to produce signals of the same or opposite polarities. The assumption in the above description was that the polarities are the same. With opposite polarities, signal $S_4$ would be derived from a subtractor to obtain the total count-rate and signal $S_3$ would be obtained from an added for the difference between counter rates. These changes and other modifications that do not depart from the present invention are apparent to one skilled in the art.

It is apparent that navigational system 10 just described can be employed with any type of aircraft. For further example, the directional detectors 7 and 15 and electrical system 45 can be installed in a blimp or helicopter.

Figure 8:
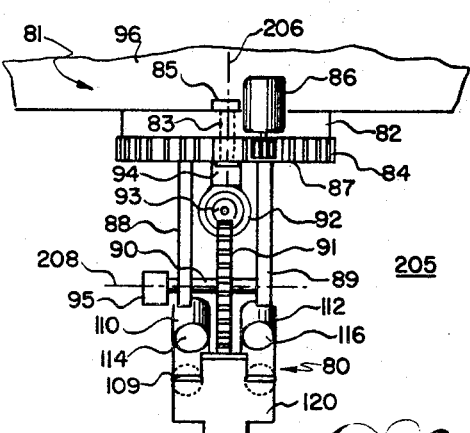
FIG. 8 is a front elevation view showing the directional detector of FIG. 7 tilted downward.
Figure 9:
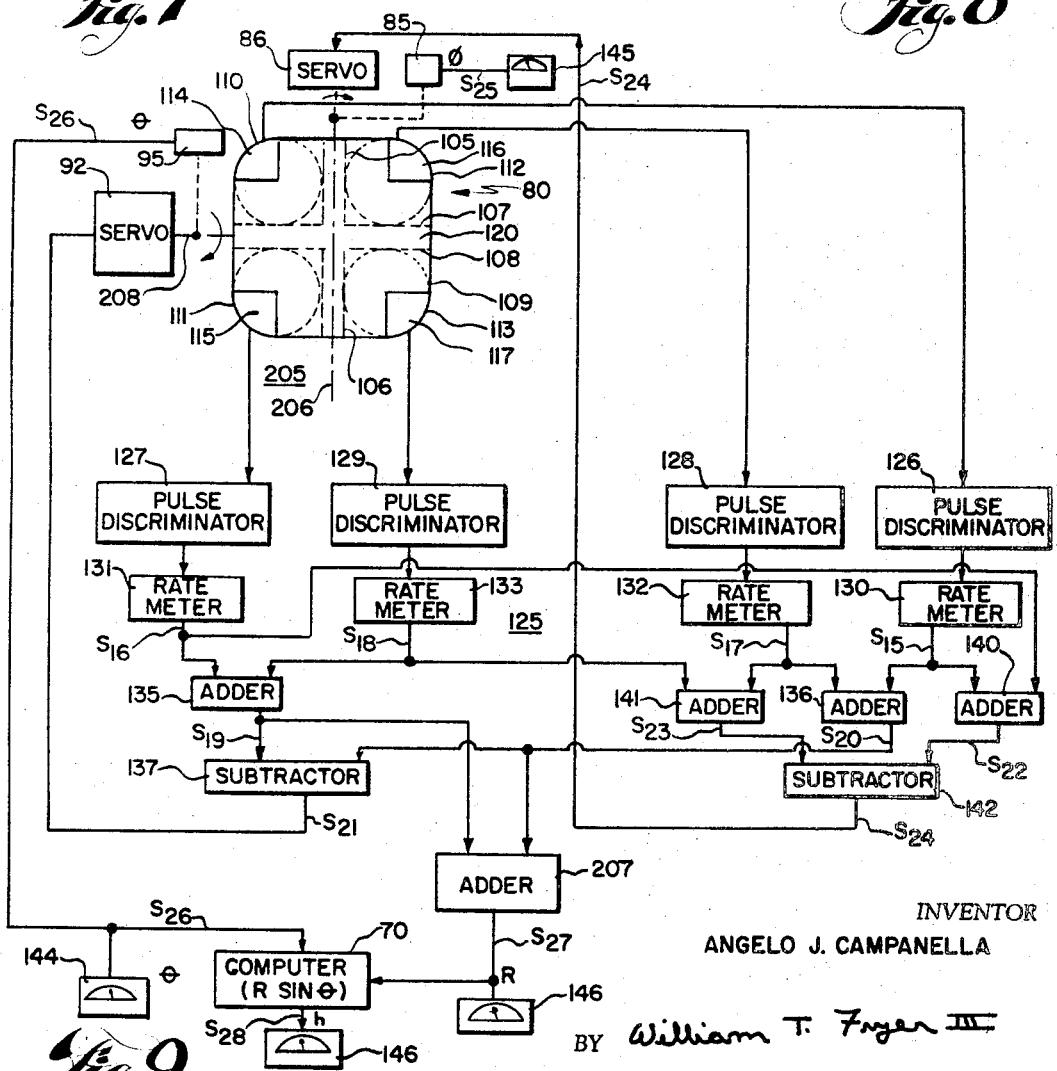
FIG. 9 is a block diagram of one arrangement of electrical system for the directional detector of FIGS. 7 and 8.

Another embodiment of the present invention is the tracking unit 205 illustrated in FIGS. 7, 8, and 9. Instead of a fixed azimuth angle directional detector and tracking elevation angle directional detector, tracking unit 205 has a directional detector 80 that tracks in both azimuth and elevation planes. The angular deviations $\theta$ and $\phi$ with respect to reference positions in the planes of movement are provided by shaft position sensors to compute $h$ and R in essentially the same manner as in previously described electrical system 45.

Directional detector 80 is supported on base 81 for three-dimensional movement. Base 81 is fixed to airplane 1 or, preferably, suspended when in use from airplane 1 on a universal mount (not shown) that is maintained by a gyro stabilizer, as described for carriage 16, to keep the respective measuring planes vertical and horizontal. Alternatively, when base 81 is fixed to airplane 1, measurements are taken only when airplane 1 correctly places directional detector 80 in the desired attitude. Base 81 comprises a bracket 96 for attachment to airplane 1 or a universal mount. Bracket 96 has fixed thereto a circular disc 82 with a central aperture that receives a shaft 83 attached to a gear wheel 84. Shaft 83 is mounted in bearings (not shown) in disc 82 to rotate about axis 206. Attached to the upper end of shaft 83 is a position sensor 85 that produces a signal that is a function of the angular position of gear wheel 84 from a reference position that places the azimuth position of directional detector 80 pointing in the direction of aircraft heading 6. Gear wheel 84 is driven by servomotor 86, mounted on base 81, through a pinion 87 in response to a control signal to be described hereinafter.

Directional detector 80 is supported for movement in elevation. Gear wheel 84 has two downwardly extending, parallel arms 88 and 89 fixed thereto. Arms 88 and 89 support a shaft 90 rotatably mounted in bearings (not shown) and fixed to a gear wheel 91. Gear wheel 90 is driven by a servomotor 92 through a pinion 93 to rotate about axis 208 of shaft 90. Servomotor 92 is attached by a bracket 94 to gear wheel 84. Shaft 90 has attached at one end a position sensor 95 that produces an electrical signal which is a function of the angular deviation of shaft 90 from a reference position at which directional detector 80 points in the direction of aircraft heading 6 when also in the reference azimuth position. Servomotor 92 is driven in response to a control signal to be described hereinafter.

Directional detector 80 moves with gear wheel 91 in a vertical plane for alignment with radiation from beacon 4. Gear wheel 91 is attached to a cross-shaped shadow-edge member 100 having elongated vertically disposed sides 101, 102, and horizontally disposed sides 103 and 104, as viewed in FIG. 7 and corresponding sides 105, 106 and 107 and 108, respectively (FIG. 9). Shadow-edge member 100 comprises a cross-shaped mask 109 (FIG. 9) attached at the forward end. Secured back from mask 109 on shadow-edge member 100 are gamma radiation transducers 110, 111, 112, and 113, between sides 101 and 103, 102 and 104, 105 and 107, and 106 and 108, respectively having gamma radiation reception faces 114, 115, 116 and 117, respectively. Looking directly at the front of directional detector 80 (as in FIG. 9), mask 109 has a leading face 120 and exposes equal areas of each of radiation transducer radiation faces 114, 115, 116, and 117. Accordingly, when the radiation arrives at an angle to one side of direct alignment, one or more of the radiation tranducers will receive different amounts of the radiation.

The control signals for continuously positioning directional detector 80 in alignment with the radiation from beacon 4, where each radiation transducer is receiving substantially the same radiation intensity, is provided by an electrical system 125 (FIG. 9). As described previously for electrical system 45, each of radiation transducers 110, 111, 112, and 113 produces electrical pulses, amplitude substantially proportional to energy, in response to the gamma radiation hitting its reception face. These pulses are coupled to separate discriminators 126, 127, 128 and 129, respectively, and thence to separate rate meters 130, 131, 132, 133, respectively, to produce signals $S_{15}$, $S_{16}$, $S_{17}$, and $S_{18}$ that are a function, respectively, of the radiation intensity at radiation transducer reception faces 114, 115, 116, and 117, respectively. Signals $S_{16}$ and $S_{18}$ are added in an adder 135 to produce signal $S_{19}$ and signals $S_{15}$ and $S_{17}$ are added in adder 136 to produce signal $S_{20}$. Signals $S_{19}$ and $S_{20}$ are subtracted in subtractor 137 to produce elevation control signal $S_{21}$. Elevation control signal $S_{21}$ is a function of the difference between the total count-rates reaching radiation transducers 110 and 112 and the total count-rate reaching radiation transducers 111 and 113. When the difference is zero, signal $S_{21}$ is zero. The signal polarity depends on which total count rate is greater. Signal $S_{21}$ controls the energization of servomotor 92, determining the direction and amount of rotation to bring directional detector 80, its pointing axis, into alignment in elevation with radiation from beacon 4.

For the azimuth control signal, signals $S_{15}$ and $S_{16}$ are added in adder 140 to produce signal $S_{22}$. Signals $S_{17}$ and $S_{18}$ are added in adder 141 to provide signal $S_{23}$. Signals $S_{22}$ and $S_{23}$ are subtracted in subtractor 142 to provide azimuth control signal $S_{24}$ that is coupled to servomotor 86. Azimuth control signal $S_{24}$ is a function of the difference between the total count-rate reaching radiation transducers 110 and 111 and the total count-rate reaching radiation transducers 112 and 113. When the difference is zero, control signal $S_{24}$ is zero and the signal polarity depends on which total count-rate is greater. Signal $S_{24}$ controls the energization of servomotor 86, determining the direction and amount of rotation to bring directional detector 80, its pointing axis, into alignment in azimuth with radiation from beacon 4.

The elevation angular deviation from the elevation reference position is measured by sensor 95 which produces signal $S_{26}$, that is a function of $\theta$. Signal $S_{26}$ is coupled to meter 144 calibrated in degrees, plus and minus, from the elevation reference position. The azimuth angular deviation from the azimuth reference position is measured by sensor 85 which produces signal $S_{25}$ that is a function of $\theta$. Signal $S_{25}$ is coupled to meter 145 calibrated in degrees, plus and minus, from the azimuth reference position. Signals $S_{19}$ and $S_{20}$ are added in adder 207 to provide signal $S_{27}$ that is a function of slant range R. Signal $S_{27}$ is coupled to meter 146 calibrated in units of distance to read out R. Both height $h$ and horizontal distance X can be computed, as described previously. As shown, computer 70 receives signals $S_{26}$ and $S_{27}$ and provides a signal $S_{28}$ that is a function of $h$, using the relation $h = R \sin \theta$. Signal $S_{28}$ is coupled to a meter 146 calibrated in units of distance to read out $h$.

Discriminators 126, 127, 128, 129, are arranged to pass pulses in an amplitude range centered around the primary energy of the gamma rays from beacon 4. Some background radiation can be eliminated in this way. The various components of electrical system 45 individually can be of several conventional designs. Further, the manner of combination of the rate meter output signals is dependent on the electronics, i.e., whether the rate meters are designed to produce signals of the same or opposite polarities. The assumption in the above description was that the polarities are the same. With opposite polarities, signals $S_{19}$, $S_{20}$, $S_{22}$, and $S_{23}$ would be derived from a subtractor to obtain the total count rate and signals $S_{21}$ and $S_{24}$ would be obtained from an adder for the difference between count rates. These changes and other modifications that do not depart from the present invention are apparent to one skilled in the art.

The operation of tracking unit 205 and electrical system 125 is continuous. Directional detector 80 tracks beacon 4, aligning with the radiation therefrom. The pilot can observe meter 145 to steer airplane heading 6 towards beacon 4 in azimuth. The meters 144 and 146 are preferably combined in an integrated flight display for the pilot to indicate the airplane height and the elevation angular position for guidance to landing area 2 to either drop supplies or land airplane 1.

Another embodiment of the present invention is navigational system 185 (FIGS. 10, 11, and 12) wherein airplane 1 is equipped with two separately operating three dimensional gamma ray tracking units 150 and 151, of the same construction as tracking unit 205 previously described. Navigational system 185 does not depend on an intensity measurement for range information, but, rather, utilizes the angle of divergence of two beacons on a known base line. A long base line, say 500 feet, allows reasonable accuracy.

Tracking units 150 and 151 comprise directional detectors 80' and 80", respectively, of the same construction and arrangement as previously described directional detector 80, which are combined with bases 81' and 81", respectively, corresponding to base 81, and are coupled to electrical systems (not shown) corresponding to electrical system 125. Tracking units 150 and 151 are mounted back-to-back on opposite sides of a support 152 (FIG. 11) and extend outward on opposite sides of a support 152 (FIG. 11) and extend outward on opposite sides of airplane 1. The rotational axes 153 and 154 of tracking units 150 and 151 are coincident. The elevation reference positions, as shown in FIG. 11, are in the same horizontal plane that includes axes 153 and 154. The lateral reference positions, as shown in FIG. 11, of directional detectors 80' and 80" are in vertical, parallel planes that include vertical axes 155 and 156, respectively. Tracking units 150 and 151 are either fixed to airplane 1 or, preferably attached to a carriage 157 (only partially shown in FIG. 11) that has universal movement and is attached to airplane 1 to continuously maintain the same vertical and horizontal attitude of support 152 irrespective of the position of airplane 1, so that the reference positions of tracking units 150 and 151 remain as shown in FIG. 11.

As shown in FIG. 10, airplane 1 approaches landing area 2 where a beacon array 159 is disposed. Beacon ray 159 comprises two beacons 4' and 4", each corresponding in construction to previously described beacon 4, and spaces a distance S apart. Tracking units 150 and 151 track a different one of beacons 4' and 4" to measure the lateral angles $\psi_1$ to beacon 4" and $\psi_2$ to beacon 4' from aircraft heading 6 and the elevation angle $\theta_1$ to beacon 4" and $\theta_2$ to beacon 4' from aircraft heading 6. $\psi_1$ and $\psi_2$ are the angles formed between the lines 180 and 181 and the vertical projection 210 of the heading 6, all of lines S, 180, 181, and 210 lying in the same plane. The electrical systems for tracking units 150 and 151, corresponding to electrical system 125, provide the signals that are a function of $\theta_1$, $\theta_2$, $\psi_1$, and $\psi_2$ to a computer 170 (FIG. 12) that calculates height $h$ using known geometrical relations. It will be apparent to those skilled in the art that the values of slant range, R, height, $h$, and horizontal distance-to-go, $b$, can be determined from the measured values of $\theta_1$, $\theta_2$, $\psi_1$, and $\psi_2$ along with the previously known values of S throughout the hemisphere above touchdown 12. When these measured and known values are fed into computer 170, obeying the proper trigonometric transformations from S, $\theta_1$, $\theta_2$, $\psi_1$, and $\psi_2$ to R, $h$, and $b$. For example, near the desired glide path, where angle $\theta_1$ very nearly equals $\theta_2$, the height, $h$, slant range, R, and distance-to-go, $b$, can be calculated from the relations $$R = \frac{S}{2} \cot\left(\frac{\psi_1 + \psi_2}{2}\right) \quad (1)$$

$$h = R \sin\left(\frac{\theta_1 + \theta_2}{2}\right) \quad (2)$$

$$b = R \cos\left(\frac{\theta_1 + \theta_2}{2}\right) \quad (3)$$

The signal that is a function of $h$ is coupled to meter 172 calibrated in units of distance to read out height. The signals that are a function of $\theta_1$ and $\theta_2$, respectively, are subtracted in subtractor 173 to provide an output signal that is a function of the difference between elevation angles $\theta_1$ and $\theta_2$, $\Delta\theta$. The $\Delta\theta$ signal is coupled to a meter 174 calibrated in degrees to read out the difference between the elevation angles. The signals that are a function of $\psi_1$ and $\psi_2$ are subtracted in a subtractor 175 to provide a signal that is a function of the difference between angles $\psi_1$ and $\psi_2$, $\Delta\psi$. The $\Delta\psi$ signal is coupled to a meter 176 calibrated in degrees to read out the difference between the angles.

Meters 171, 172, 174 and 176 are mounted together on the pilot's instrument panel or, preferably, these meters are combined for an integrated flight display.

Aircraft 1 is guided to landing area 2 by the pilot observing meter 176 for steering information. When $\Delta\psi$ is zero and $\Delta\theta$ is zero airplane 1 is heading directly between beacons 4' and 4''. In the case $\theta_1$ equals $\theta_2$ and $\psi_1$ equals $\psi_2$, airplane 1 is approaching landing area 2 on a path normal to the line S between beacons 4' and 4''. Computer 170 is arranged to compute $h$, $b$ and R, the slant range along line 425 forming a right angle with base line S, from the relation (1), (2), and (3) above. As mentioned, the signal $\Delta\psi$ will be useful for steering aircraft 1. When aircraft 1 is on the glide path and the wind direction is perpendicular to the baseline, S, or the wind velocity is zero, the value of $\Delta\psi$ will be zero. When the wind direction is not perpendicular to the baseline, S, $\Delta\psi$ will not be zero when aircraft 1 is on the glide path, but the rate of change of $\Delta\psi$ with time or distance will be zero. The output signal that is a function of R from computer 170 is coupled to a meter 171 calibrated in units of distance to read out slant range R. The signal $\Delta\theta$ will always be zero when aircraft 1 is on the desired glide path. The value of $\Delta\theta$ will be one polarity when aircraft 1 is positioned far to the left of the desired glide path, and $\Delta\theta$ will be on the other polarity when aircraft 1 is positioned far to the right of the desired glide path. The value of $\theta_1$ and $\theta_2$ or preferably their average, $(\theta_1+\theta_2)/2$ will be greater than some pre-assigned value, i.e., the desired glide path angle, when aircraft 1 is too high, and less than this pre-assigned value when aircraft 1 altitude is too low.

In order to insure that the respective tracking units 150 and 151 seek the proper beacon, the beacons can have different primary energy ranges. The discriminators coupled to the radiation transducers of tracking unit 150 can be set to pass substantially only pulses corresponding to the general energy range of gamma radiation from beacon 4', substantially excluding pulses corresponding to the general energy range of beacon 4''. The discriminators of tracking unit 151 can be set to pass substantially only pulses corresponding to the general energy range of beacon 4'', substantially excluding pulses corresponding to the general energy range of beacon 4'. The gamma radiation energies for beacons 4' and 4'' are sufficiently different, to give good signal resolution with minimum interference. Appropriate radioactive materials that emit different energy ranges with the intensity desired can be selected for beacons 4' and 4'', respectively.

Detectors 150 and 151 can be mounted on carriage 157 with axes 153 and 154 vertical and axes 155 and 156 horizontal (picture two of detectors 205 mounted as shown in FIG. 8). In this arrangement each detector measures an azimuth and elevation angle and R, $h$, and $b$ can be computed.

Different radiation energy beacons also can be used to signify wind direction. For example, when the higher energy beacon is on the airplane starboard, the landing direction is correct. If airplane 1 approaches landing field 2 downwind, the higher energy beacon is on the portside and the tracking units sense the fact that the beacons are not on the correct sides. Each discriminator in each tracking unit can have pilot selectable pass bands, one for each beacon energy range, and the pilot, by determining which energy ranges the tracking units are operating properly on can find the desired landing direction. In maneuvering airplane 1 in this manner, the pilot must known only which energy range should be on which side for the desired landing direction relative to the wind direction.

Airplane 1 can be guided manually, semi-automatically or automatically, in accordance with the present invention. For automatic guidance, the information derived from a navigational system is fed to a computer that activates the flight controls to follow a desired path. For example, automatic landing of airplane 1 is provided by computer 190 (FIG. 13). Signals that are a function of height $h$, elevation angle ($\theta$, $\theta_1$ or $\theta_2$) and azimuth angle $\phi$, or $\Delta\psi$ derived from navigational systems 10 or 185 are coupled to computer 190. The elevation angle signal is compared in a subtractor 191 to obtain the difference between a programmed elevation angle $\theta'$ for the aircraft height $h$ from programmer 192 and the instant elevation angle. The programmer 192 receives the height signal and couples the corresponding programmed angle elevation $\theta$ to subtractor 191. Subtractor 191 produces a signal that is a function of the difference between the programmed and instant elevation angle, $\Delta\theta'_1$ (pitch) is coupled to autopilot 193 that proportionally adjusts the elevator or rudder, or both, of airplane 1 to bring the elevation angle to the programmed elevation angle $\theta'$. Autopilot 193 also receives the azimuth angle signal and proportionally adjusts the flight controls to steer aircraft 1 toward the beacon(s). The air speed of aircraft 1 is measured and a signal that is a function thereof is compared in subtractor 194 with a programmed air speed signal. Subtractor 194 provides a signal that is a function of the difference between the air speed and the programmed air speed for controlling the aircraft throttle through a servo 195. Programmer 196 receives the height signal and provides the air speed signal that corresponds to the desired landing speed for the measured height.

Automatic landing or guidance can be particularly useful with slow speed aircraft where the pilot is able instantly to regain manual control if visual observation becomes practical.

Other embodiments of the present invention could be shown. Numerous changes and modifications in the illustrated preferred embodiments can be made by one skilled in the art without departing from the present invention, the scope of which is defined by the appended claims.

What is claimed is:
1. An aircraft guidance system comprising, an aircraft,
 a beacon positioned in a landing area for emitting a substantially omnidirectional nuclear radiation beam,
 means mounted on said aircraft for sensing the direction of radiation from said beacon and providing a first signal that is a function of angular deviation of the radiation from the aircraft heading in a first reference plane and a second signal that is a function of angular deviation of the radiation from the aircraft heading in a second reference plane, said first and second reference planes intersecting, and means responsive to said first and second signals for providing guidance information.

2. An aircraft guidance system comprising, an aircraft, a beacon positioned in a landing area for emitting a substantially omnidirectional nuclear radiation beam, first means mounted on said aircraft for sensing the direction of radiation from said beacon and producing a first signal that is a function of the azimuth angular deviation of said aircraft heading from said beacon, second means mounted on said aircraft for sensing the direction of radiation from said beacon and producing a second signal that is a function of the elevation angular deviation of said aircraft heading from said beacon, and means responsive to said first and second signals for providing guidance information.

3. An aircraft guidance system comprising, an aircraft, a beacon positioned in a landing area for emitting a substantially omnidirectional nuclear radiation beam, first directional detector means mounted on said aircraft and having a pointing axis fixed in a first plane of said aircraft and extending generally in the direction of the aircraft heading and providing a first signal that is a function of the angular deviation of the radiation from said pointing axis in said first plane, a second directional detector means mounted on said aircraft and having a pointing axis angularly movable in a second plane from a reference position extending generally in the direction of the aircraft heading to align with the direction of the radiation and providing a second signal that is a function of the angular deviation of the radiation from said pointing axis reference position in said second plane, said first and second planes intersecting, and means responsive to said first and second signals for providing information on the position of said aircraft relative to said beacon.

4. An aircraft guidance system comprising, an aircraft, a beacon positioned in a landing area for emitting a substantially omnidirectional nuclear radiation beam, first directional detector means mounted on said aircraft and having a pointing axis angularly movable in a first plane from a reference position extending generally in the direction of the aircraft heading to align with the direction of the radiation and providing a first signal that is a function of the angular deviation of the radiation from said pointing axis reference position in said first plane, a second directional detector means mounted on said aircraft and having a pointing axis angularly movable in a second plane from a reference position extending generally in the direction of the aircraft heading to align with the direction of the radiation and providing a second signal that is a function of the angular deviation of the radiation from said pointing axis reference position in said second plane, said first and second planes intersecting, and means responsive to said first and second signals for providing information on the position of said aircraft relative to said beacon.

5. An aircraft guidance system comprising, an aircraft, an array of beacons comprising at least two spaced beacons positioned on a base line in a landing area for emitting substantially omnidirectional nuclear radiation beams, a first directional detector means having a first pointing axis movable in two substantially right angle intersecting first and second planes, to align with the direction of the radiation from one of said beacons, said first pointing axis having reference positions in each of said planes extending generally in the direction of the aircraft heading and providing a first signal that is a function of the angular deviation of the radiation from said first pointing axis reference position in said first plane and a second signal that is a function of the angular deviation of the radiation from said first pointing axis reference position and said second plane, a second directional detector means having a second pointing axis movable in two substantially right angle intersecting third and fourth planes to align with the direction of the radiation from the other one of said beacons, said second pointing axis having reference positions in each of said third and fourth planes extending generally in the direction of the aircraft heading and providing a third signal that is a function of the angular deviation of the radiation from said second pointing axis reference position in said third plane and a fourth signal that is a function of the angular deviation of the radiation from said second pointing axis reference position in said fourth plane, and means responsive to said first, second, third, and fourth signals for providing guidance information on the position of said aircraft relative to said array of beacons.

6. An aircraft guidance system comprising, an aircraft, a source of gamma rays located in a landing area and collimating the gamma rays to radiate substantially upward in a large solid angle, a first directional detector means comprising a first shield member mounted on said aircraft having an elongation in the direction of the aircraft heading and opposite sides to be positioned substantially in vertical planes, first gamma radiation transducer on one side of said shield member and having a reception face pointed along the shield member elongation and positioned back from the leading edge of said shield member and producing a first signal that is a function of radiation intensity on said reception face, a second gamma radiation transducer on the opposite side of said shield member and having a reception face pointed in the same direction as the reception face of said first radiation transducer and producing a second signal that is a function of radiation intensity on said reception face, first computer means coupled to produce a third signal that is a function of the difference between said first and second signals and thereby indicating the degree of alignment of said aircraft with the radiation from said source in azimuth, a second directional detector means comprising a second shield member pivotally mounted on said aircraft for movement in a plane held substantially vertical during flight and having an elongation and a leading face in the direction of the aircraft heading, said second shield member having upper and lower sides, a third gamma radiation transducer adjacent one side of said second shield member and having a reception face pointed along the shield elongation and positioned back from the leading face of said second shield member and producing a fourth signal that is a function of radiation intensity on said reception face, a fourth gamma radiation transducer on the opposite side of said second shield member and having a reception face pointed in the same direction as the reception face of said third radiation transducer and producing a fifth signal that is a function of radiation intensity on said reception face.

second computer means coupled to produce a sixth signal that is a function of the difference between said fourth and fifth signals, a servo coupled to said sixth signal and driving said second shield member to an angular position where the radiation intensity on said third and fourth radiation transducer faces is substantially the same, thereby aligning the second shield member length with the radiation direction from said source, and means for producing a seventh signal that is a function of the angular position of said second shield member, being proportional to the elevation angular deviation of the aircraft heading from said source, third computer means coupled to add said first, second, fourth, and fifth signals to provide an eighth signal that is a function of the range of said aircraft to said source, and fourth computer means coupled to said eighth and seventh signals and arranged to continuously indicate the height of said aircraft over the landing area and the horizontal distance from the landing area.

7. An aircraft guidance system comprising, an aircraft, a source of gamma rays located in a landing area and collimating the gamma rays to radiate substantially upward in a large solid angle, a base rotatably mounted on said aircraft for movement in a first plane held substantially horizontal during flight, a directional detector comprising a cross-shaped shield member pivotally mounted on said base for movement in a second plane held substantially vertical during flight and having an elongation and leading face in a direction from said pivotal mount, said shield member having first and second upper opposite sides and third and fourth lower opposite sides, a first gamma radiation transducer adjacent said first upper side and having a reception face pointed along the shield elongation and positioned back from said leading face of said shield member and producing a first signal that is a function of radiation intensity on said reception face, a second gamma radiation transducer adjacent said first radiation transducer on said second upper side and having a reception face pointed along the shield elongation and producing a second signal that is a function of radiation intensity on second radiation transducer reception face, third and fourth gamma radiation transducers adjacent said first radiation transducer on said third and fourth sides, respectively, each of said third and fourth radiation transducers having reception face pointed along said shield elongation, and producing signals, third and fourth, respectively, that is a function of radiation intensity on the respective radiation transducer faces, a first servo means for controlling the angular position of said base, a second servo means for controlling the angular position of said shield member, a first computer means coupled to said first, third and fourth signals and producing a fifth signal that is a function of the difference between the sum of said first and second and the sum of said third and fourth signals and producing a sixth signal that is a function of the difference between the sum of said first and third and the sum of said second and fourth signals, said first computer means adding said first, second, third and fourth signals to provide a seventh signal that is a function of the range of said aircraft to said source, said fifth signal being coupled to said first servo means to position said shield member substantially in line with the source radiation in said second plane, means for producing a ninth signal that is a function of the angular position in elevation of said shield member, said sixth signal being coupled to said second servo means to move said base to a position where said shield member is substantially in line with said source radiation in said first plane, means for producing a tenth signal that is a function of the angular position in azimuth of said shield member, and said first computer means being arranged to provide an eighth signal that is a function of the height of the said aircraft over the landing area by trigonometric computation from said seventh and ninth signals.

8. An aircraft guidance system comprising, an aircraft, two sources of gamma rays located in a landing area along a base line, each source collimating the gamma rays to radiate substantially upward in a large solid angle, first and second gamma radiation tracking units, each comprising a base rotatably mounted on said aircraft for movement in a plane held substantially horizontal during flight, a directional detector comprising a cross-shaped shield member pivotally mounted on said base for movement in a first plane held substantially vertical during flight and having an elongation and leading face in a direction from said pivotal mount, said shield member having first and second upper opposite sides and third and fourth lower opposite sides, a first gamma radiation transducer adjacent said first side and having a reception face pointed along the first shield member elongation and positioned back from said leading face of said first shield member and producing a first signal that is a function of radiation intensity on said first radiation transducer reception face, a second gamma radiation transducer adjacent said first radiation transducer on said second side and having a reception face pointed along said shield member elongation and producing a second signal that is a function of radiation intensity on said second radiation transducer face, third and fourth gamma radiation transducers each having a reception face pointed along said shield member elongation, and producing a signal, third and fourth, respectively, that is a function of radiation intensity on the respective radiation transducer faces, a first servo for controlling the angular position of said base, a second servo means for controlling the angular position of said shield member, a first computer means coupled to said first, second, third and fourth signals and producing a fifth signal that is a function of the difference between the sum of said first and second and the sum of said third and fourth signals and producing a sixth signal that is a function of the difference between the sum of said first and third and the sum of said second and fourth signals, said first computer means adding said first, second, third and fourth signals to provide a seventh signal that is a function of the range of said aircraft to one of said sources, said fifth signal being coupled to said first servo means to position said shield member substantially in line with the radiation from said one source in said second plane, means for producing a ninth signal that is a function of the angular position in elevation of said shield member, said sixth signal being coupled to said second servo means to move said base to a position where said shield member is substantially in line with said one source radiation in said first plane, means for producing a tenth signal that is a function of the angular position in azimuth of said shield member, and means coupled to receive said ninth and tenth signals from each of said tracking devices to provide an eleventh signal that is a function of the difference between said ninth signals, the angular difference in elevation position of said tracking units, to provide a twelfth signal that is a function of the height of said aircraft from said landing area, and to provide a thirteenth signal that is a function of slant range of said aircraft to said base line.

References Cited

UNITED STATES PATENTS 2,656,470  10/1953  Herzog ---------- 250—106 X
2,992,330  7/1961  Cooper et al. ------ 250—106 X ARCHIE R. BORCHELT, *Primary Examiner.*